Oct. 29, 1968  H. F. COFFER ETAL  3,407,605
METHOD FOR ISOLATING A CAVITY
Filed Dec. 23, 1963

INVENTORS
H. F. COFFER
D. A. SHOCK
W. W. WOODS
J. M. CRAWFORD
BY
L. David Trapnell
ATTORNEY

United States Patent Office 3,407,605
Patented Oct. 29, 1968

3,407,605
METHOD FOR ISOLATING A CAVITY
Henry F. Coffer, D'Arcy A. Shock, Warren W. Woods, and John M. Crawford, Ponca City, Okla., assignors to Continental Oil Company, Ponca City, Okla., a corporation of Delaware
Filed Dec. 23, 1963, Ser. No. 332,644
11 Claims. (Cl. 61—1)

ABSTRACT OF THE DISCLOSURE

A method of isolating from egress and ingress of fluids a cavity which extends into the earth and is in communication with a fluid permeable formation. The fluid permeable formation is fractured and the fracture filled with a material which sets to form a fluid impermeable barrier.

---

This invention relates broadly to a method of insulating a cavity into the earth and more particularly is directed to a method of placing a barrier of insulating medium beneath and about a cavity which extends into the earth but has communication with the surface.

At the present time, cavities having a variety of sizes and forms are used for almost an infinite number of purposes which can be generally categorized as being for the storage of materials or the housing of facilities, examples being a water reservoir or a missile site, respectively. In the case of a reservoir-type cavity, there are numerous instances when it is extremely desirable to effect the preclusion of undesirable fluids therefrom and conversely to effect the inclusion of those materials which are purposely retained within the reservoir. The use of a cavity for housing facilities, equipment, and men is often of such a nature to make it extremely desirable to prevent the occurrence of undesirable fluids within a reasonable distance thereof, particularly the influx of water or other electrically conductive fluids about an installation housing complex electrical and electronic equipment.

In spite of the desirability of insulating the subterranean portions of the earth surrounding such a cavity, there are presently no known means of accomplishing such insulation aspect in a manner which is effective and economical. The only approach to achieving the desirable results is the careful selection of the site having the requisite naturally occurring conditions for the installation, which greatly restricts the number of locations available for the sites of such cavities; and even after careful selection, there is no real assurance that the desired conditions of the selected site will continue to exist for the life of the cavity. Further, it is also to be noted that there is no method for insulating existing cavities which now or at some later date need to be insulated from the ingress or egress of fluids.

An object of this invention is to provide a method for suitably insulating cavities extending into the earth existing presently or in the future from the undesirable ingress or egress of fluids.

A further object of this invention is to provide a method for conditioning essentially any location as a suitable site for a cavity for the storage or housing of materials or facilities.

Another object of this invention is to provide a method of treating existing cavities in order to properly insulate the same.

Other objects and advantages of the method of this invention will be apparent from the following detailed description thereof and the drawing in which.

Broadly, the present invention is directed to a method of insulating cavities extending into the earth by drilling one or more wells into the earth in a zone located in a subterranean position about the cavity, said wells being completed in a conventional manner for fracturing operation or operations, whereafter the zone about the cavity is subjected to fracturing to open up a channel or connected channels in the zone whereby an insulating medium or material can be injected into the fracture through the wells and allowed to solidify substantially in order to provide an insulating barrier about the cavity.

Figure 1:
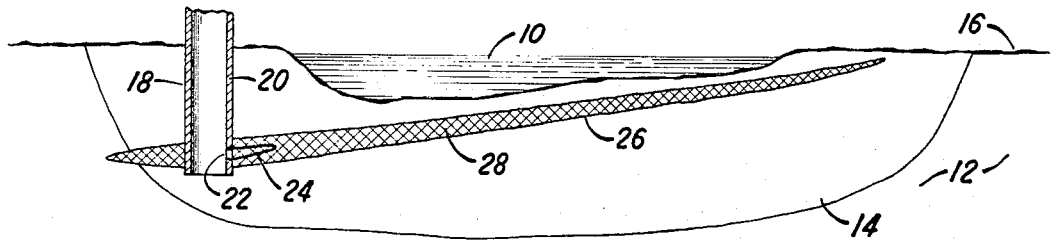
FIGURE 1 is a diagrammatic elevational view of an application of this invention.
Figure 2:
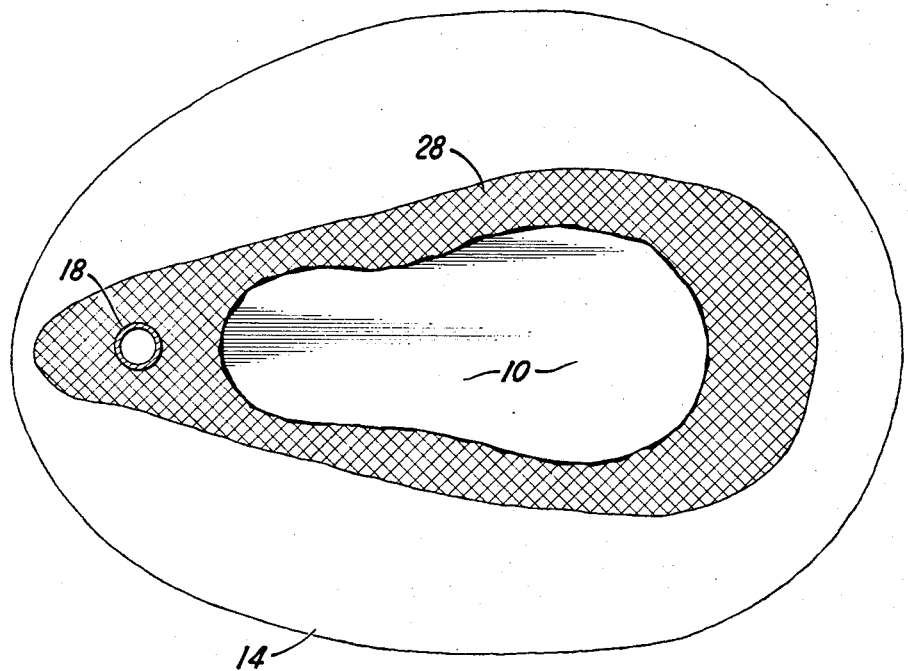
FIGURE 2 is a diagrammatic top view of the same application of this invention as set forth in FIGURE 1.

The description of the disclosed method in terms of the drawing set forth hereinafter is not to be construed as limiting the invention but is for the purpose of illustrating a simple application thereof. Referring to FIGURE 1, a cavity 10 representing a small lake extends into the earth 12 which is desirably insulated by the present method. A zone 14 is defined about and adjacent said cavity extending to the surface of the earth 16 thereabout, and a well bore 18 is drilled into said zone with casing 20 being set in the well. The casing is subjected to perforation 22 and the adjacent formation is directionally perforated 24 as pre-orientation for fracturing. The well is prepared for fracturing and a fracture 26 is extended through zone 14 about cavity 10, whereafter insulating medium in the form of asphalt is injected into said fracture forming an insulating barrier 28. The surface equipment for the described operations has not been shown as the same is conventional to the petroleum industry. Referring to FIGURE 2, the view is illustrative of cavity 10, zone 14, well bore 18, and insulating barrier 28.

The term cavity, as used herein, includes essentially any hole extending into the earth which has at least some communication with the earth's surface. These holes can be either naturally occurring or artificially occurring, in the sense of being constructed or man-made. One general class of such cavities is characterized as reservoirs, such as, surface reservoirs in the form of lakes, ponds, and the like, for the storage of water and other liquids or storage caverns for the retention of hydrocarbon or other fluids, such as solution or shaft mined caverns. In general, this category of cavities is one wherein it is desirable to prevent both egress of stored fluid and ingress of contaminating fluids. Another category of cavities is designed to house equipment installations such as radar sites, missile sites, tracking sites, etc., wherein it is desirable to prevent the ingress or invasion of undesirable fluids into a zone extending for a reasonable distance about the cavity. Stated in another manner, it consists of those cavities wherein the cavity and a section of earth about the same are desirably maintained in a substantially dry condition for operation of the equipment housed therein.

After determining that the cavity or a site for a cavity can advantageously be insulated in accordance with the teachings of the present invention, it is desirable to define the limits of the zone adjacent to and about said cavity which are most conducive to effective subterranean fracturing. There are a number of methods and systems for determining the geological structure of a subterranean area; and any of the conventional techniques such as those utilized in the production of petroleum can be utilized. The limits of the zone about a reservoir cavity can be from a few feet to several hundred feet in distance from the cavity, depending upon the geometry of the fracturing pattern which must be achieved in order to substantially insulate said cavity. Preferably, the insulating barrier is placed as close to the cavity as possible in respect to the reservoir-type cavity. The limits of the zone about a cavity housing an installation of equipment and men depends upon the type of installation. Generally this zone extends further from the cavity than the zone about a reservoir cavity in order that the barrier can be established at least several feet from the cavity, rather than as close as possible, to preclude the occurrence of conductive fluids in the portion of the zone between the barrier and the cavity in order that operation of the equipment is not inhibited.

Subsequent to defining the zone about the cavity, a well or wells are drilled into the earth about the cavity in accordance with established techniques well known in the oil industry, said wells being completed or subjected to completion techniques as the term is used in the oil industry for fracturing, such as, by casing, cement, and the like. The number of wells necessary to accomplish the insulating method is dependent upon the size and form of the cavity, with the simplest situation being a small surface reservoir of shallow depth that can be subjected to the present method by the extension of one hole from a surface location adjacent to the cavity. A more complicated situation is a larger reservoir cavity wherein it is necessary to extend a number of holes about the periphery of the reservoir and perhaps one or more through the actual reservoir into a zone thereunder, and the most complicated is a cavity of the subterranean cavern type wherein it is necessary to extend a number of wells about the perimeter of the cavity and possibly including the necessity of directionally drilling a well beneath the cavity.

Having extended the necessary well or wells into the zone about the cavity, said zone having disposition adjacent and configurative to said cavity and completing said well or wells, the next step of this method is to create a fracture or fractures in the zone, intermediate of the above-said cavity. The fracturing of subterranean formations is an extremely well-known art; and conventional fracturing techniques can be employed with the reservation that the fracturing necessary for the present method often requires the application of selective directional fracturing in order to extend the fractures in vertical or horizontal disposition, or at angles intermediate thereof, said directions being expressed in relation to the horizontal nature of the earth's surface. The practice of directional fracturing is well-known in the art with the same being accomplished by subjecting the formation to be fractured to a preliminary notching, reaming, jet or explosive perforating, bullet perforating, and the like in order to stimulate a preoriented failure of the formation structure to direct the disposition of the fracture.

The techniques of directional fracturing are known and practiced in the art; and generally such fracturing includes preorienting the fracture, subjecting the formation to a fracturing fluid under extremely high hydraulic pressure until a formation breakdown is indicated by a pressure drop in the pumping equipment, whereafter the fracturing fluid is continued to be pumped through the well bore into the fracture to extend the fracture to a desired distance.

In accordance with this method, the fracture or fracture series is usually directed to enclose the portion of the zone about the cavity with substantial completeness. It is within the scope of this method, however, to restrict the enclosure to lesser coverage in the event that only a portion of the zone adjacent to one section of the cavity to be insulated is necessary, such as, the bottom of a reservoir-type cavity. In the event that the configuration of the cavity is such that the zone adjacent to the same makes it desirable, multiple fractures can be extended from the same well at different depths within the said zone.

The isolation of a small cavity with a single fracture is accomplished by directionally fracturing from a single well bore at an angle sufficient to direct the fracture to the surface in the appropriate locations in order to accordingly isolate said cavity, as illustrated in the drawing. In the event that the configuration of the cavity is such that a number of fractures must be extended from a plurality of well locations, the same is accomplished by spacing the wells in order that the fractures from adjacent wells will intersect at the peripheries thereof and thus form a continuous fracture. Alternately, in the event that the zone is extremely extensive, the fractures are initiated from a first well or wells to a next adjacent series of wells to intersect with the wells, whereafter the intersected wells are utilized to sequentially fracture and extend the fracture in a continuous manner to other wells in the zone or through the zone to effect completion of the isolating fracture.

After the fracture has been initiated and subsequently extended throught the zone, the injection of fracturing fluid into the fracture is terminated; and an insulating medium is injected into the fracture displacing the fracturing fluid and establishing the insulating or sealing medium within the fracture. Alternatively, it is envisioned that the fracturing operation can be accomplished utilizing the insulating medium if the same has the requisite characteristics to qualify as a fracturing fluid; and it is envisioned that the portion of the fracturing operation normally referred to as the fracture extension can also be accomplished by substituting the insulating medium for the conventional fracturing fluid. The insulating medium of the present method is esentially any material which can be made pumpable in some form and is capable of forming an impermeable barrier to the fluid or fluids anticipated as being precluded from or retained in the cavity to which this method is applied. The insulating medium preferably undergoes a setting reaction or otherwise solidifies to form a substantially permanent barrier within the fracture, such materials being for example asphalt, polymeric materials, such as phenolics or epoxies, cement, and silicate.

After the insulating medium has been injected into the fracture within the zone adjacent to and about the cavity to form a substantially continuous barrier, the same is retained in place under pressure for a period of time necessary to enable the medium to have an adequate setting or solidifying period. After expiration of the requisite period of time, the pressure may be released on the insulating medium within the fracture, thus completing the method of insulating a cavity extending into the earth.

In the foregoing detailed description, it will be apparent that many variations may be made without departing from the scope and spirit of the invention. We, therefore, intend to be limited only in accordance with the following patent claims.

We claim:

1. A method of preventing fluid egress from and ingress into a cavity which extends into the earth and has a point of communication with the earth's surface which comprises:
    (a) locating that portion of the subterranean zone which is permeable to fluid flow, defines a wall portion of said cavity or is adjacent and about said cavity, and is capable of being fractured;
    (b) drilling at least one well into said portion of said subterranean zone;
    (c) completing said well for fracturing;
    (d) fracturing said permeable portion of said subterranean zone intermediate of and about said cavity through said well to create a fracture between said cavity and all said surrounding permeable portions of said formation through which fluid flow may occur except the point at which said cavity is in communication with the earth's surface;
    (e) injecting a fluid impermeable barrier medium through said well to fill said fracture; and
    (f) retaining said medium in said fracture until said medium has substantially solidified in place to isolate said cavity within said permeable zone from fluid flow inwardly and outwardly from said permeable zone.

2. A method of preventing fluid egress from and ingress into a cavity extending into the earth as set forth in claim 1 wherein said fracturing is in combination horizontally, vertically, and angularly disposed through said zone intermediate of and about said cavity through said well bore.

3. The method of preventing fluid egress from and ingress into a cavity extending into the earth as set forth in claim 1 wherein said fracturing is horizontally disposed through said zone intermediate of and about said cavity through said well bore.

4. The method of preventing fluid egress from and ingress into a cavity extending into the earth as set forth in claim 1 wherein said fracturing is vertically disposed through said zone intermediate of and about said cavity through said well bore.

5. The method of preventing fluid egress from and ingress into a cavity extending into the earth as set forth in claim 1 wherein said fracturing is angularly disposed through said zone intermediate of and about said cavity through said well bore.

6. The method of preventing fluid egress from and ingress into a cavity extending into the earth as set forth in claim 1 wherein said fluid impermeable barrier medium is asphalt.

7. The method of preventing fluid egress from and ingress into a cavity extending into the earth as set forth in claim 1 wherein said fluid impermeable barrier medium is cement.

8. The method of preventing fluid egress from and ingress into a cavity extending into the earth as set forth in claim 1 wherein said fluid impermeable barrier medium is polymeric material.

9. The method of preventing fluid egress from and ingress into a cavity extending into the earth as set forth in claim 1 wherein said fluid impermeable barrier medium is silicate.

10. The method of preventing fluid egress from and ingress into a cavity extending into the earth as set forth in claim 1 wherein two or more wells are employed, and said fracturing through said zone intermediate of and about said cavity is by a plurality of intersecting fractures extending from said wells through said zone.

11. The method of preventing fluid egress from and ingress into a cavity extending into the earth as set forth in claim 1 wherein two or more wells are employed, and said fracturing through said zone intermediate of and about said cavity is by a plurality of fractures extending from a portion of said wells intersecting into other adjacent wells and sequentially extended from said adjacent wells through said zone.

References Cited

UNITED STATES PATENTS

| | | | |
|---|---|---|---|
| 299,425 | 5/1884 | Schillinger | 61—36 |
| 2,368,424 | 1/1945 | Reistle | 166—42.1 X |
| 2,627,169 | 2/1953 | Poulter | 61—35 |
| 2,786,530 | 3/1957 | Maly | 166—10 |
| 2,811,207 | 10/1957 | Clark | 166—22 |
| 3,120,263 | 2/1964 | Hoyt | 166—42.1 X |
| 3,172,470 | 3/1965 | Huitt et al. | 166—42.1 X |
| 3,237,690 | 3/1966 | Karp et al. | 166—42.1 X |

FOREIGN PATENTS

| | | |
|---|---|---|
| 322,858 | 10/1902 | France. |
| 858,967 | 3/1953 | Germany. |

EARL J. WITMER, *Primary Examiner.*

JACOB L. NACKENOFF, *Examiner.*